United States Patent [19]
Stokes

[11] 3,815,616
[45] June 11, 1974

[54] RADIATOR CLEANING TANK

[76] Inventor: Bennie J. Stokes, 2615 Lena St., Sulphur, La. 70663

[22] Filed: Mar. 6, 1973

[21] Appl. No.: 338,514

[52] U.S. Cl............. 134/105, 134/135, 134/141, 134/143, 68/197
[51] Int. Cl......................... B08b 3/04, B08b 9/00
[58] Field of Search.......... 134/105, 135, 140, 141, 134/143, 169 A; 68/197

[56] References Cited
UNITED STATES PATENTS

| | | | |
|---|---|---|---|
| 2,494,224 | 1/1950 | Benson | 134/141 UX |
| 2,715,409 | 8/1955 | Wachs | 134/135 X |
| 2,741,253 | 4/1956 | Bernier et al. | 134/141 |
| 3,169,538 | 2/1965 | Arnaudin | 134/141 |
| 3,246,659 | 4/1966 | Ballard | 134/105 |
| 3,441,036 | 4/1969 | Lemoine | 134/140 |
| 3,760,823 | 9/1973 | Ferguson | 134/141 |

*Primary Examiner*—Robert L. Bleutge
*Attorney, Agent, or Firm*—Clarence A. O'Brien; Harvey B. Jacobson

[57] ABSTRACT

An upwardly opening tank including opposite ends and a pair of upright standards supported and projecting upwardly from opposite end portions of the bottom wall of the tank disposed along the longitudinal centerline of the tank. A horizontal rack is supported within the tank and includes upstanding downwardly opening guide tubes telescopingly engaged with the standards. The upper ends of the guide tubes include laterally outwardly offset and depending support arms disposed outwardly of vertical transverse planes containing the end walls of the tank and a pair of horizontal longitudinally extending operating shafts are journaled beneath the bottom wall of the tank on opposite sides of the longitudinal centerline thereof. A pair of upstanding crossed levers are secured to each pair of corresponding ends of the operating shafts and the upper ends of each pair of crossed levers are connected to the lower ends of the corresponding support arms of the guide tubes by means of a pair of links having one pair of lower ends pivotally connected to the upper ends of the levers and the other pair of upper ends thereof pivotally connected to the support arms. Also, one pair of corresponding ends of the shafts include crank arms carried thereby and the remote end portions of the cylinder and piston rod of a fluid cylinder are pivotally connected to the free ends of the crank arms in a manner such that expansion of the fluid cylinder causes the upper ends of the crossed levers to be swung toward each other and contraction of the cylinder causes the upper ends of the crossed levers to swing apart, thereby raising the guide tubes or sleeves when the fluid cylinder is extended and lowering the guide tubes and rack supported therefrom when the fluid cylinder is contracted.

9 Claims, 4 Drawing Figures

PATENTED JUN 11 1974

RADIATOR CLEANING TANK

The tank of the instant invention has been specifically designed as a tank in which automotive type radiators may be boiled in a cleaning solution. The tank includes an elevatable and depressible rack for supporting radiators to be cleaned thereby enabling radiators to be fully immersed in the cleaning solution within the tank and elevated above the cleaning solution after the cleaning process has been completed for ease in removal of radiators from the tank. Further, the tank includes an internal heating structure whereby the cleaning fluid within the tank may be heated. However, the tank of the instant invention may also be utilized as a repair tank for containing water into which a repaired, closed and pressurized radiator may be immersed in order to test for leaks. However, while the tank of the instant invention is provided with a top which is automatically shifted between open and closed positions as the interior rack is elevated and lowered and the top is provided to prevent the heated cleaning fluid within the tank from being bubbled and splattered out of the tank, should the tank be utilized for radiator testing purposes, the top or cover may be removed or merely swung to an over-center open position.

The main object of this invention is to provide a radiator cleaning tank into which automotive type radiators may be placed and immersed in a heated cleaning fluid.

Another object of this invention is to provide a tank including an elevatable rack for supporting radiators to be cleaned in order that the radiators, after being cleaned in the tank, may be elevated to a level above the heated cleaning fluid therein for ease in removal of the cleaned radiators from the tank.

A still further object of this invention is to provide a tank in accordance with the preceding objects and equipped with a cover or lid which is automatically swung between the open and closed positions as the elevatable radiator supporting rack within the tank is shifted between its raised and lowered positions.

Another important object of this invention is to provide a radiator tank including novel external motor means disposed at one end of the tank and operative to raise and lower both ends of the elevatable rack disposed within the tank.

A final object of this invention to be specifically enumerated herein is to provide a radiator cleaning tank in accordance with the preceding objects which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
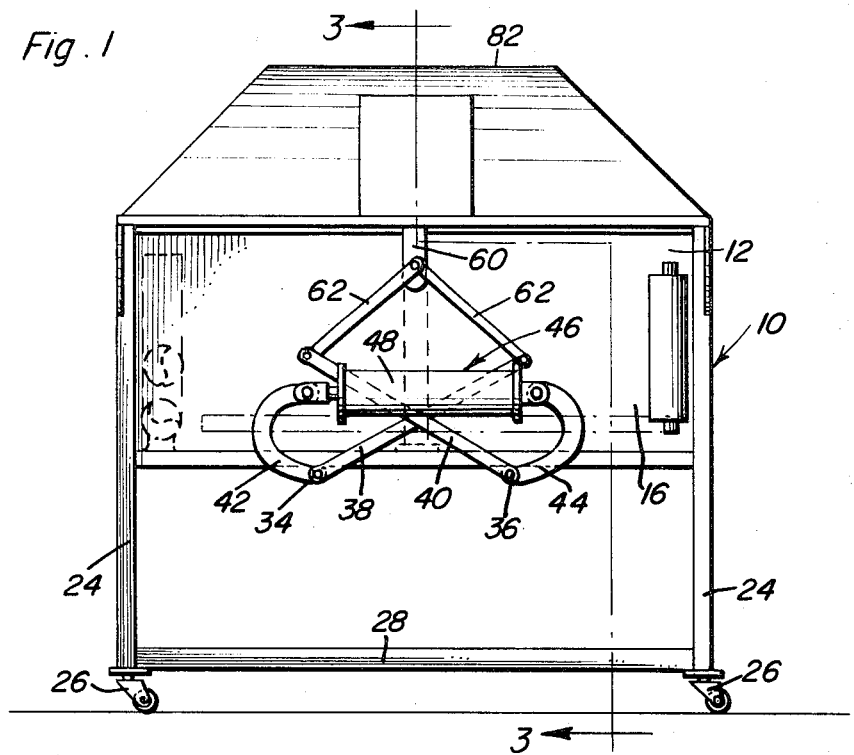
FIG. 1 is an end elevational view of the tank of the instant invention.

Referring now more specifically to the drawings, the tank of the instant invention is referred to in general by the reference numeral 10 and includes a tank assembly 12 consisting of a pair of opposite end walls 14 and 16 and longitudinally extending front and rear walls 18 and 20 interconnected by means of a bottom wall 22. The four corner portions of the tank structure 12 include upstanding legs 24 bracing the corners of the tank structure 12 and depending downwardly from the latter and provided with caster wheel assemblies 26 on their lower ends. The lower end portions of the legs 24 are interconnected by means of front to rear extending opposite end transverse braces 28.

The opposite ends of the tank structure 12 each includes a pair of front to rear spaced journal blocks 32 and each pair of forward journal blocks 32 journals the opposite ends of a front longitudinal shaft 34 while each pair of rear journal blocks journals the opposite ends of a rear longitudinal shaft 36. The opposite ends of the shafts 34 and 36 project outwardly beyond the corresponding end walls 14 and 16 and each pair of corresponding ends of the shafts 34 and 36 are provided with a pair of upwardly projecting crossed levers 38 and 40 whose lower ends are secured to the corresponding shaft ends for swinging therewith.

The ends of the shafts 34 and 36 which project outwardly of the end wall 14 are further provided with arcuate crank arms 42 and 44 and the crank arms 42 and 44 are upwardly divergent. A fluid cylinder referred to in general by the reference numeral 46 is provided and includes a cylinder portion 48 and a piston rod portion 50. The opposite ends of the portions 48 and 50 are pivotally secured to the free ends of the crank arms 44 and 42, respectively, and in this manner the fluid cylinder 46 is supported from the crank arm 42 and 44.

A gas fired heater assembly referred to in general by the reference numeral 52 is disposed within the tank structure 12 a spaced distance inwardly of the rear wall 20 thereof and may be communicated in any convenient manner (not shown) to a suitable source of gas fuel.

A pair of opposite end standards 54 are secured to and project upwardly from the bottom wall 22 at points spaced slightly inwardly of the end walls 14 and 16 and disposed along the longitudinal centerline of the tank structure 12 and the upper end portions of the standards 54 have downwardly opening guide tubes 56 telescoped thereover. The guide tubes support a radiator support rack 58 from their lower ends and the upper ends of the guide tubes 56 include outwardly offset depending support arms 60 to whose lower ends two pairs of links 62 are pivotally secured as at 64. The links 62 are upwardly convergent with their upper ends pivotally anchored to the lower ends of the support arms 60 and the lower ends of each pair of links 62 are pivotally secured to the upper ends of the corresponding levers 38 and 40 as at 66.

The cylinder or fluid motor 46 is of the hydraulic type and is communicated with an oil reservoir 70 by means of any suitable oil lines (not shown). Air under pressure is supplied in any convenient manner (not shown) over the oil in the reservoir 70 in order to extend the cylinder 46 and thus raise the rack 58.

Figure 2:
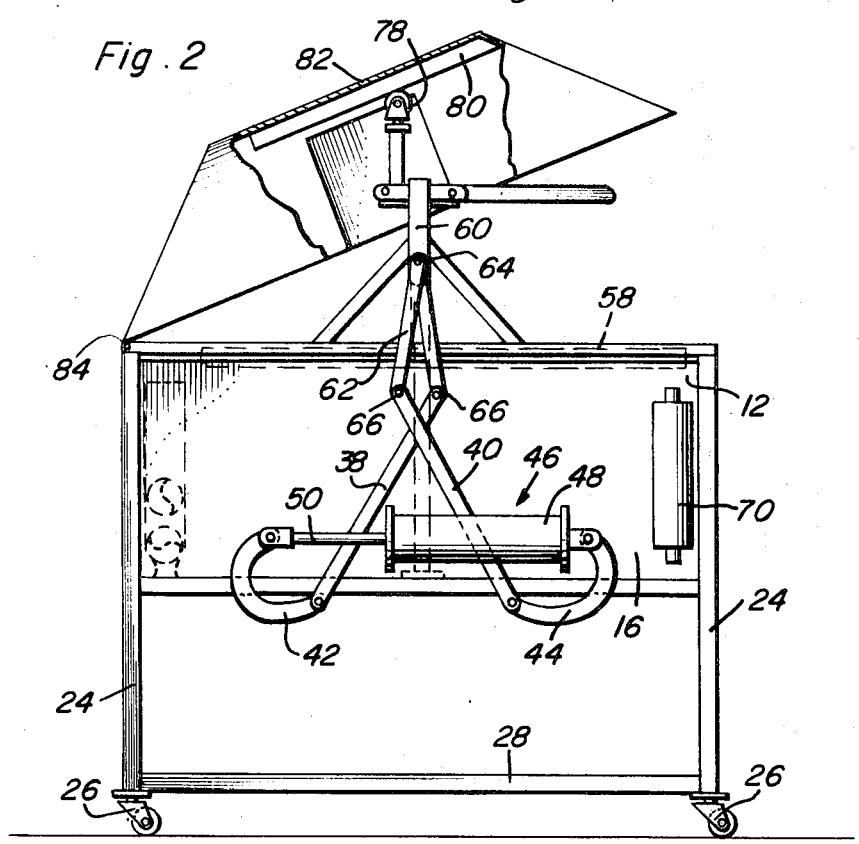
FIG. 2 is an end elevational view of the tank with the radiator supporting rack and cover in the elevated and open positions, respectively.
Figure 3:
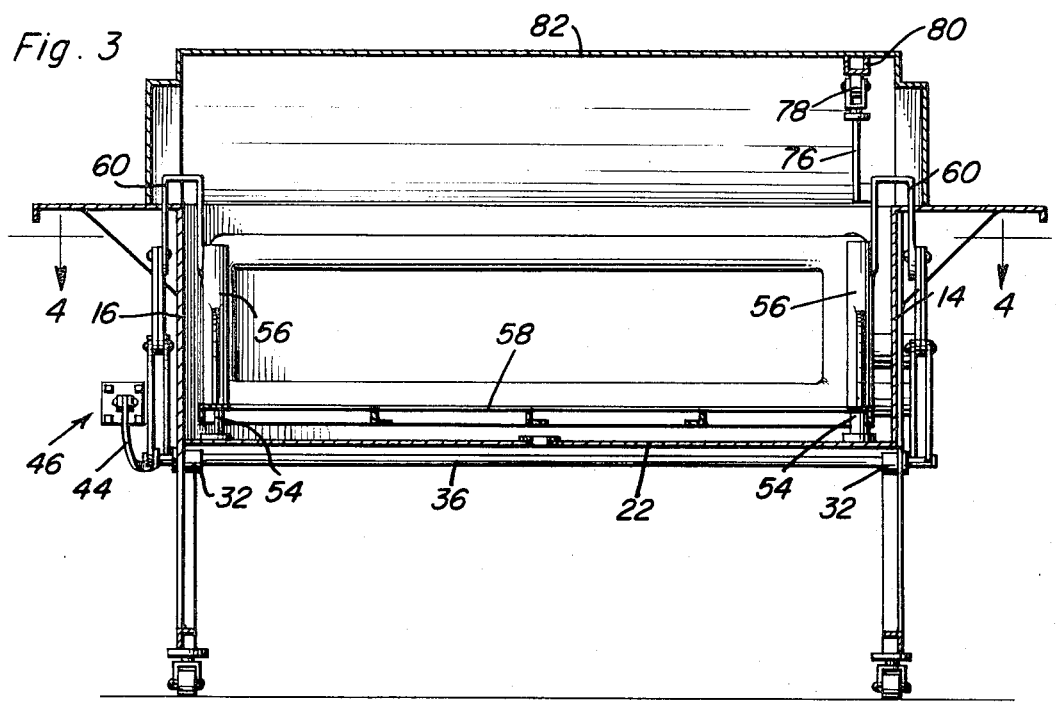
FIG. 3 is a longitudinal vertical sectional view taken substantially upon the plane indicated by the section line 3—3 of FIG. 1.
Figure 4:
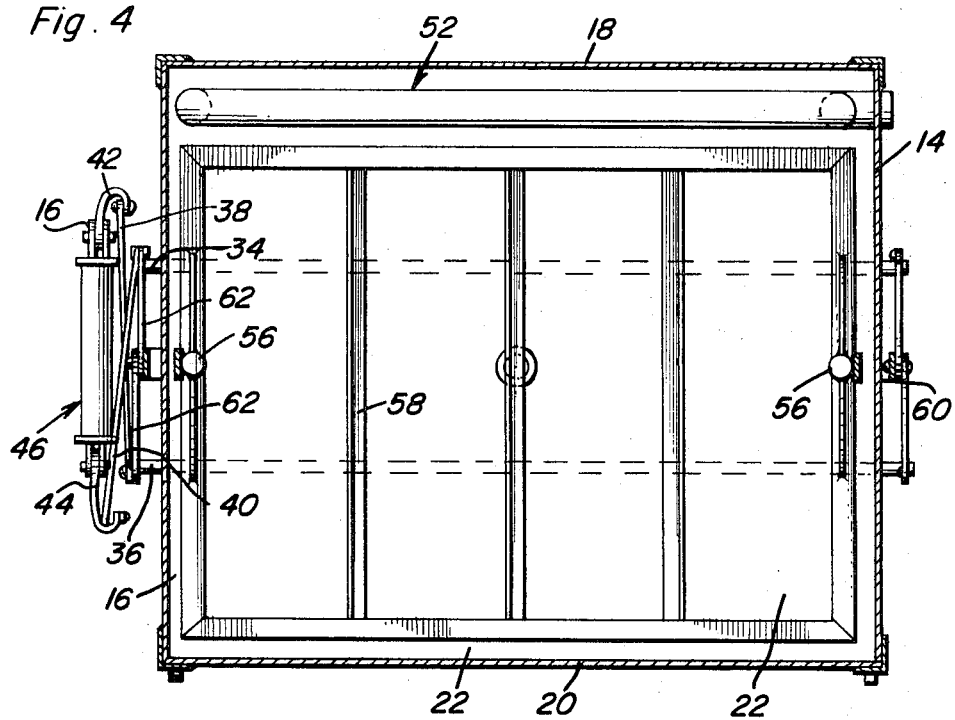
FIG. 4 is a horizontal sectional view taken substantially upon the plane indicated by the section line 4—4 of FIG. 3.

In addition, the support arm 60 at the end wall 14 of the tank structure 12 is provided with an upwardly projecting arm 76 having a roller 78 journaled from its upper end and rollingly engaged with a transverse track member 80 secured to the underside of a top 82 hinged to the back wall or rear wall 20 of the tank structure 12 as at 84. Accordingly, as the hydraulic cylinder 46 is expanded from the position thereof illustrated in FIG. 1 of the drawings with the rack 58 in a lowered position and the cover or top 82 in the closed position, not only is the rack 58 elevated but the cover 52 is swung toward the open position thereof illustrated in FIG. 2 of the drawings. Of course, as one pair of levers 38 and 40 are swung relative to each other to raise the corresponding guide tube 56, the other pair of crossed levers 38 and 40 are also being swung relative to each other so as to raise the corresponding guide tubes 56. Therefore, the opposite ends of the rack 58 are raised and lowered together during relative oscillation of the shafts 34 and 36. Thus, it may be seen that only a single fluid motor is utilized to raise both ends of the rack 58 and that the fluid motor 46 is supported solely from the free ends of the crank arms 42 and 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tank including upstanding opposite side wall portions interconnected by a bottom wall extending therebetween, a support rack disposed in said tank between said side wall portions for vertical shifting therein, said rack including lift portions carried thereby and disposed outwardly of said side wall portions, a pair of laterally spaced shafts journaled beneath said bottom wall and extending between said opposite side wall portions, an upstanding lazy tong assembly connected at its lower end to each pair of corresponding shaft ends and to the corresponding lift portion for raising and lowering said lift portions in response to simultaneous oscillation of said shafts, and motor means operatively connected to one pair of shaft ends for oscillating said shafts.

2. The combination of claim 1 wherein said motor means comprises an extendable fluid cylinder assembly including remote relatively shiftable piston rod and cylinder ends, a pair of crank arms carried by said one pair of shaft ends, said remote rod and cylinder ends being pivotally anchored to the free ends of said crank arms.

3. The combination of claim 1 wherein said tank includes a second pair of upstanding side wall portions extending between pairs of corresponding ends of the first mentioned side wall portions, a cover for said tank overlying the latter and pivotally supported from the upper marginal edge portion of one of said side wall portions for swinging about an axis extending along said upper marginal edge, one of said left portions including an upper portion from which a roller is journaled for rotation about an axis generally paralleling the first mentioned axis and rollingly engaged with a downwardly facing surface of said cover for swinging the free edge of the cover upwardly in response to raising of said one lift portion.

4. The combination of claim 1 wherein said crank arms are upwardly convergent, said lazy tong assemblies each comprising a pair of crossed upstanding arms pivotally interconnected intermediate their opposite ends and having their lower ends secured to the corresponding shaft ends, and a pair of upwardly convergent links whose lower ends are pivotally secured to the upper ends of the corresponding arms and whose upper ends are pivotally secured together and to the corresponding lift portion.

5. The combination of claim 1 wherein said tank includes an internal heater assembly for heating cleaning liquids disposed therein.

6. The combination of claim 1 wherein said motor means comprises an extendable fluid cylinder assembly including remote relatively shiftable piston rod and cylinder ends, a pair of crank arms carried by said one pair of shaft ends, said remote rod and cylinder ends being pivotally anchored to the free ends of said crank arms, said tank including a second pair of upstanding side wall portions extending between pairs of corresponding ends of the first mentioned side wall portions, a cover for said tank overlying the latter and pivotally supprted from the upper marginal edge portion of one of said side wall portions for swinging about an axis extending along said upper marginal edge, one of said left portions including an upper portion from which a roller is journaled for rotation about an axis generally paralleling the first mentioned axis and rollingly engaged with a downwardly facing surface of said cover for swinging the free edge of the cover upwardly in response to raising of said one lift portion.

7. The combination of claim 6 wherein said crank arms are upwardly convergent, said lazy tong assemblies each comprising a pair of crossed upstanding arms pivotally interconnected intermediate their opposite ends and having their lower ends secured to the corresponding shaft ends, and a pair of upwardly convergent links whose lower ends are pivotally secured to the upper ends of the corresponding arms and whose upper ends are pivotally secured together and to the corresponding lift portion.

8. A tank including upstanding opposite side wall portions interconnected by a bottom wall extending therebetween, a support rack disposed in said tank between said side wall portions for vertical shifting therein, said rack including lift portions carried thereby and disposed outwardly of said side wall portions, a pair of laterally spaced shafts journaled beneath said bottom wall and extending between said opposite side wall portions, and motion transmitting means operatively connected between each pair of corresponding ends of said shafts and the corresponding lift portion for raising and lowering said lift portions in response to oscillation of said shafts.

9. The combination of claim 8 including motor means operatively connected between said shafts, supported entirely from the latter and operative to simultaneously rotate said shafts.

* * * * *